(12) United States Patent
Matteucci et al.

(10) Patent No.: US 8,322,211 B2
(45) Date of Patent: Dec. 4, 2012

(54) BALANCING MACHINE FOR BALANCING VEHICLE WHEELS

(75) Inventors: Marco Matteucci, Rio Saliceto (IT); Mauro Zona, Turin (IT)

(73) Assignee: SICAM S.r.l., Correggio (RE) (IT)

( * ) Notice: Subject to any disclaimer, the term of this patent is extended or adjusted under 35 U.S.C. 154(b) by 667 days.

(21) Appl. No.: 12/385,933

(22) Filed: Apr. 24, 2009

(65) Prior Publication Data
US 2009/0266161 A1    Oct. 29, 2009

(30) Foreign Application Priority Data
Apr. 28, 2008   (IT) .............................. MO2008A0124

(51) Int. Cl.
*G01M 1/02* (2006.01)
(52) U.S. Cl. ........................................................ 73/487
(58) Field of Classification Search ..................... 73/460, 73/462, 487; 301/5.21
See application file for complete search history.

(56) References Cited

U.S. PATENT DOCUMENTS

| | | | | | |
|---|---|---|---|---|---|
| 5,244,331 | A | * | 9/1993 | Ruhl | 414/429 |
| 5,821,416 | A | * | 10/1998 | Hjort-Hansen | 73/487 |
| 6,622,551 | B2 | * | 9/2003 | Ruhl et al. | 73/146 |
| 7,337,664 | B2 | * | 3/2008 | Matteucci et al. | 73/487 |
| 2004/0083810 | A1 | | 5/2004 | Racine | |
| 2006/0284147 | A1 | | 12/2006 | Matteucci et al. | |

FOREIGN PATENT DOCUMENTS

| | | |
|---|---|---|
| DE | 100 12 356 | 9/2001 |
| EP | 1 369 678 | 12/2003 |
| EP | 1 724 563 | 11/2006 |

OTHER PUBLICATIONS

European Search Report issued in European Application No. 09 15 8361 on Jul. 6, 2011.

* cited by examiner

*Primary Examiner* — John Chapman, Jr.
(74) *Attorney, Agent, or Firm* — Stein McEwen, LLP

(57) ABSTRACT

The balancing machine for balancing vehicle wheels comprises a base frame supporting a balancing spindle for balancing a vehicle wheel, a lifting device associable with the base frame and suitable for fitting and removing the wheel onto and off the balancing spindle, and a protection guard associable with the base frame and suitable for covering the wheel fitted on the balancing spindle, the lifting device and the protection guard being integrated together in a multifunctional device.

29 Claims, 5 Drawing Sheets

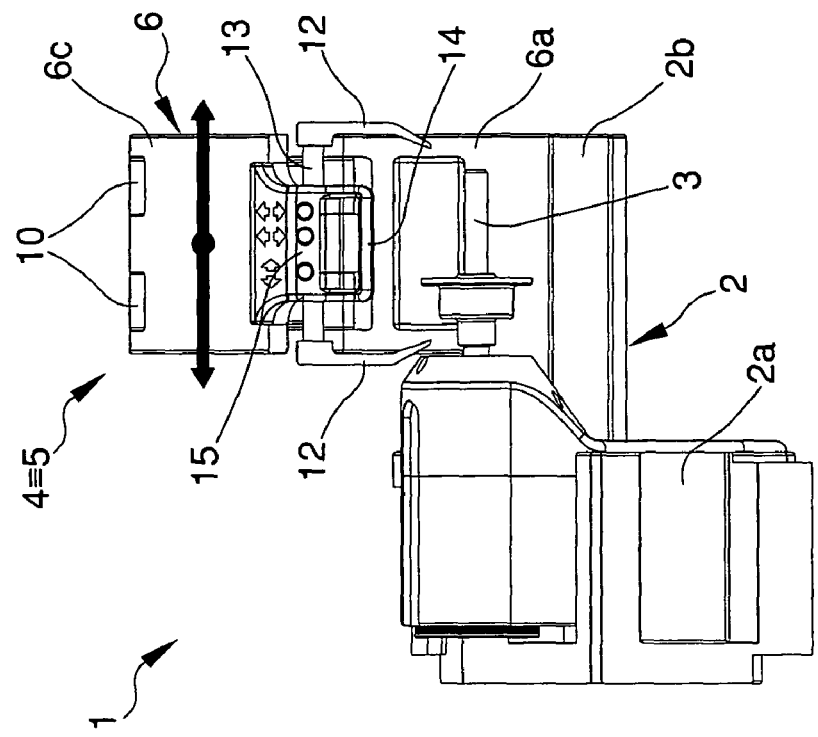
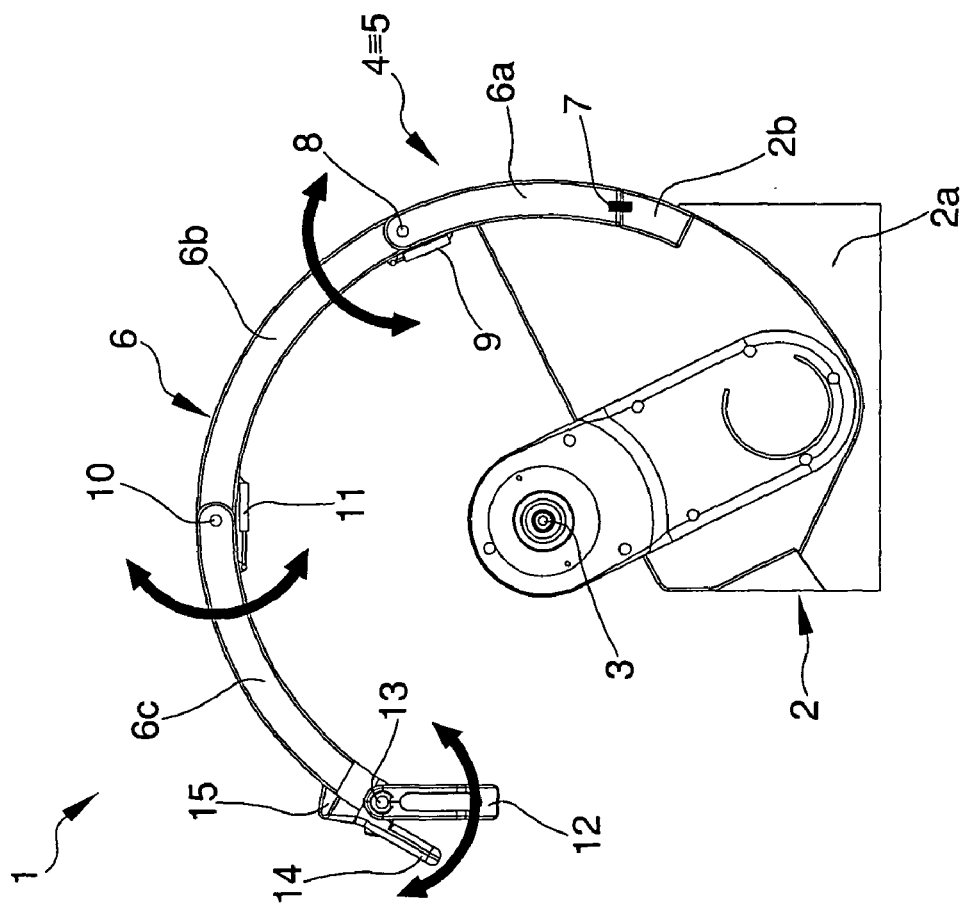
Fig. 2
Fig. 1

BALANCING MACHINE FOR BALANCING VEHICLE WHEELS

FIELD OF THE INVENTION

The present invention relates to a balancing machine for balancing vehicle wheels.

BACKGROUND OF THE INVENTION

It is known that the wheels of road vehicles require frequent balancing operations which consist in fitting to the rim of the wheel small weights, made of lead or other material, suitable for offsetting the irregular distribution of the tyre weights.

To perform such operation, balancing machines are commonly used having a rotating spindle, so-called "balancing spindle", on which the wheel to be balanced must be positioned integral, one or more parts for centering and fastening the wheel on the balancing spindle, and electronic means suitable for reading the wheel unbalance when the wheel is made to rotate by the balancing spindle.

For safety reasons, furthermore, the balancing machines are usually equipped with a wheel protection guard designed to cover the wheel when this is mounted on the balancing spindle.

Such guard, in point of fact, is a device that protects the operator from the risk of accidents due to the wheel being made to rotate, or from injuries caused by the quick and sudden ejection of the balancing weights, unless these are correctly bound to their seat, or simply by the expelling of small foreign bodies, such as stones wedged in the tyre tread.

The balancing spindle is arranged horizontally at a preset distance from the ground and the wheel is normally fitted on it manually by an operator in charge of machine operation who lifts the wheel up by hand and positions it coaxially on the balancing spindle.

Such manual operations are often uncomfortable and tiring for the operator, above all in the case in which the wheel to be balanced is considerably heavy and large.

To make the operator's task easier, the use is known of numerous types of lifting equipment of different shapes and dimensions and with differing operating procedures but which all have in common the fact of allowing the operator to lift and lower the wheel without effort, while at the same time favouring the correct centring of the wheel on the balancing spindle by means of the centring parts.

The lifting mechanisms are usually fitted close to the actual balancing machine and, usually, consist of an elevating platform, on which the wheel can be positioned resting, or of a small winch, by means of which the wheel is raised up to the height of the balancing spindle.

Balancing machines of the traditional type are susceptible to further upgrading aimed at increasing functionality and use efficiency.

Unfortunately, in fact, the presence of various auxiliary devices mounted on or near the tyre changing machines, such as, e.g., the protection guard and the lifting equipment, makes these machines fairly large in size and heavy.

Such inconvenience is particularly significant above all in consideration of the fact that, other factors being equal, the greater overall dimensions of a wheel balancing machine determine the consequent reduction of the operator's room to move, with the risk of his, or other persons near the machine, coming into contact with the moving parts of the machine itself and suffering hazardous accidents.

OBJECT OF THE INVENTION

The main aim of the present invention is to provide a balancing machine for balancing the vehicle wheels that enables the operator to position the wheel to be balanced in a practical, easy and functional way on the balancing spindle, that is able to operate in conditions of utmost safety for the operator and, at the same time, that has particularly limited weight and overall dimensions.

Another object of the present invention is to provide a balancing machine for balancing vehicle wheels which allows to overcome the above-described drawbacks of the background art within a simple, rational solution that is easy and efficient to use and low in cost.

The above objects are achieved by the present balancing machine for balancing vehicle wheels, comprising at least a base frame supporting at least a balancing spindle for balancing at least a vehicle wheel, at least a lifting device associable with said base frame and suitable for fitting and removing said wheel onto and off said balancing spindle, and at least a protection guard associable with said base frame and suitable for covering said wheel fitted on said balancing spindle, wherein said lifting device and said protection guard are together integrated in a multifunctional device.

BRIEF DESCRIPTION OF THE DRAWINGS

Other characteristics and advantages of this invention will become more evident from the description of a form of preferred, but not sole, embodiment of a balancing machine for balancing vehicle wheels, illustrated purely as an example, but not limiting, in the annexed drawings in which:

FIG. 1 is a side view of the machine according to the invention;

FIG. 2 is a front view of the machine according to the invention;

DETAILED DESCRIPTION OF THE PREFERRED EMBODIMENTS

Figure 4:
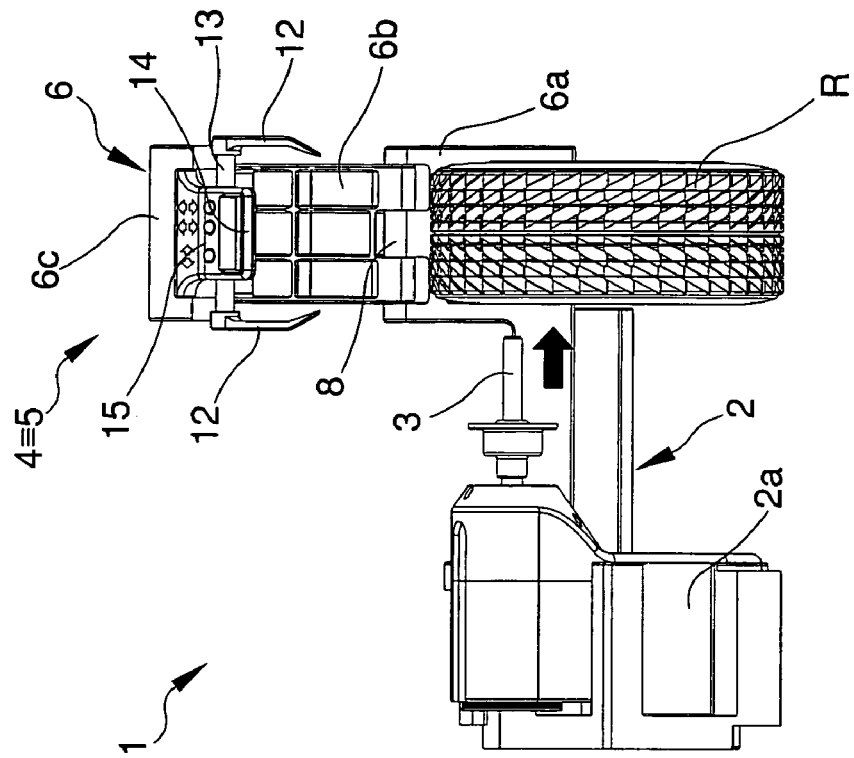
FIGS. 3 to 10 show, in a sequence of side or front views, the operation of the machine according to the invention during the lifting of a vehicle wheel.

With particular reference to such illustrations, globally indicated by 1 is a balancing machine for balancing vehicle wheels.

The machine 1 comprises a base frame 2 for resting on the ground, which supports a balancing spindle 3 onto which must be keyed a vehicle wheel R to be balanced.

The base frame 2, in particular, is made up of a main block 2a from which the balancing spindle 3 protrudes overhanging along a horizontal direction.

The main block 2a, in detail, contains the motor means for driving the balancing spindle 3 in rotation around its own axis, as well as the appliances and the devices for reading and correcting the unbalance of the wheel R.

The machine 1 also has a lifting device 4 suitable for fitting and removing the wheel R onto and off the balancing spindle 3, and a protection guard 5 suitable for covering the wheel R once this has been fitted on the balancing spindle 3.

Usefully, the lifting device 4 and the protection guard 5 are together integrated in a multifunctional device 4, 5 mounted on the base frame 2.

The multifunctional device 4, 5, in particular, comprises an arm 6 which is associated with the base frame 2 in a moving way to lift the wheel R and which, during balancing, can be placed in a protection configuration in which it is substantially shaped like the arc of a circle lying on a plane at right angles to the balancing spindle 3 and is arranged at least partially around the wheel R, coaxially and above this.

The arm 6 comprises a first arched section 6a, which is associated with the base frame 2 in a way sliding along a sliding direction substantially parallel with the balancing spindle 3.

In particular, the base frame 2 has an elongated portion 2b that extends from the main block 2a parallel with the balancing spindle 3 and along which are mounted prismatic guides 7 for sliding the first section 6a.

In the particular embodiment of the invention shown in the illustrations, the multifunctional device 4, 5 is made so the sliding movement of the first section 6a is free and, during operation, is produced by the direct push of the operator who operates the machine 1.

Alternative embodiments cannot however be ruled out in which, on the other hand, between the base frame 2 and the first section 6a first motorised actuator means are provided, of the pneumatic or hydraulic cylinder type, drive belts or the like, for driving the first section 6a along the sliding direction.

Furthermore, the arm 6 comprises a second arched section 6b, which is associated with the first section 6a by interposition of a first hinge 8.

The first hinge 8, in point of fact, allows the second section 6b to swing with respect to the first section 6a around a rotation axis parallel with the balancing spindle 3.

In the particular embodiment of the invention shown in the illustrations, between the first section 6a and the second section 6b are placed first self-balancing means 9 for distributing the weight of the wheel R on the arm 6 during the rotation of the second section 6b with respect to the first section 6a. The first self-balancing means 9, for example, are composed of a first balancer integrated at the first hinge 8.

The first balancer 9, in detail, consists of a gas spring, such as, for example, a pre-charged pneumatic cylinder which is set according to the weight of the wheel R to be lifted and which exercises a thrust force between the first section 6a and the second section 6b to assist the efforts of the operator.

This way, the operator is able to turn the second section 6b with respect to the first section 6a by simply pushing manually and without tiring him/herself. Alternative embodiments are however possible in which the arm 6 has second motorised actuator means, of the pneumatic or hydraulic cylinder type, drive belts or the like, for operating in rotation the second section 6b with respect to the first section 6a.

Advantageously, the arm 6 also comprises a third arched section 6c, which is associated with the second section 6b by placing a second hinge 10 in between. The second hinge 10 allows the third section 6c to swing with respect to the second section 6b around a rotation axis that is also parallel with the balancing spindle 3.

In the particular embodiment of the invention shown in the illustrations, between the second section 6b and the third section 6c are placed second self-balancing means 11 for distributing the weight of the wheel R on the arm 6 during the rotation of the third section 6c with respect to the second section 6b. The second self-balancing means 11 are similar to the first self-balancing means 9 and, for example, are made up of a second balancer integrated at the second hinge 10.

The second balancer 9 consists for example of a pre-charged gas spring, which is placed in between the second section 6b and the third section 6c and is set according to the weight of the wheel R to be lifted to exercise a push force to assist the efforts of the operator.

This way, the operator is able to also turn the third section 6c with respect to the second section 6b by simply pushing manually and without tiring him/herself.

In the case of the second hinge 10 as well, however, alternative embodiments of the present invention cannot be ruled out in which the arm 6 has third motorised actuator means, of the pneumatic or hydraulic cylinder type, drive belts or the like, for operating in rotation the third section 6c with respect to the second section 6b.

Usefully, the multifunctional device 4, 5 comprises grip means 12 for gripping the wheel R associated with the free extremity of the arm 6, meaning at the third section 6c.

In the particular embodiment of the invention shown in the illustrations, the grip means 12 are of the gripper type and consist of two jaws that can be positioned on the opposite sides of the wheel R.

The jaws 12 are associated with the arm 6 in a moving way in the direction of reciprocal approach and moving away from each other, and in a way turnable around a rotation axis parallel with the balancing spindle 3.

More in detail, the jaws 12 are engaged in a sliding way both in rotation and in translation on a rod 13, which has the shape of a straight cylinder and which is mounted at the free extremity of the third section 6c along a direction parallel with the balancing spindle 3.

The jaws 12 are meant to be manually operated by the operator to be tightened on the opposite sides of the wheel R, and/or to be reciprocally moved away to release the wheel R.

The jaws 12, for example, can be associated the one with the other by means of a helical spring that tends to keep them in clamping position; in this case, during the grip of the wheel R, the operator need only move the jaws away from each other, overcoming the force of the spring, place the jaws 12 on the opposite sides of the wheel R and then allow the spring to return the jaws 12 to clamping position.

Alternative embodiments of the machine 1 cannot however be ruled out in which fourth motorised actuator means are provided, of the pneumatic or hydraulic cylinder type, drive belts or the like, for operating the jaws 12 along the approach and moving away direction defined by the rod 13.

Different embodiments are also possible which have grip means 12 of other shape and nature and which, for example, consist of a hook associated with the arm 6, or the like.

Advantageously, to facilitate the movement of the arm 6, the multifunctional device 4, 5 has a handle 14 for manual grip by the operator.

In particular, the handle 14 is associated with the free extremity of the arm 6, i.e. at the third section 6c.

At the free extremity of the third section 6c are also mounted management and control means for managing and controlling the operation of the machine 1.

Such management and control means consist, for example, of a control panel 15, of the electronic/IT type, by means of which the operator is able to set the input data and start the balancing procedure.

The operation of the present invention is the following.

Figure 3:
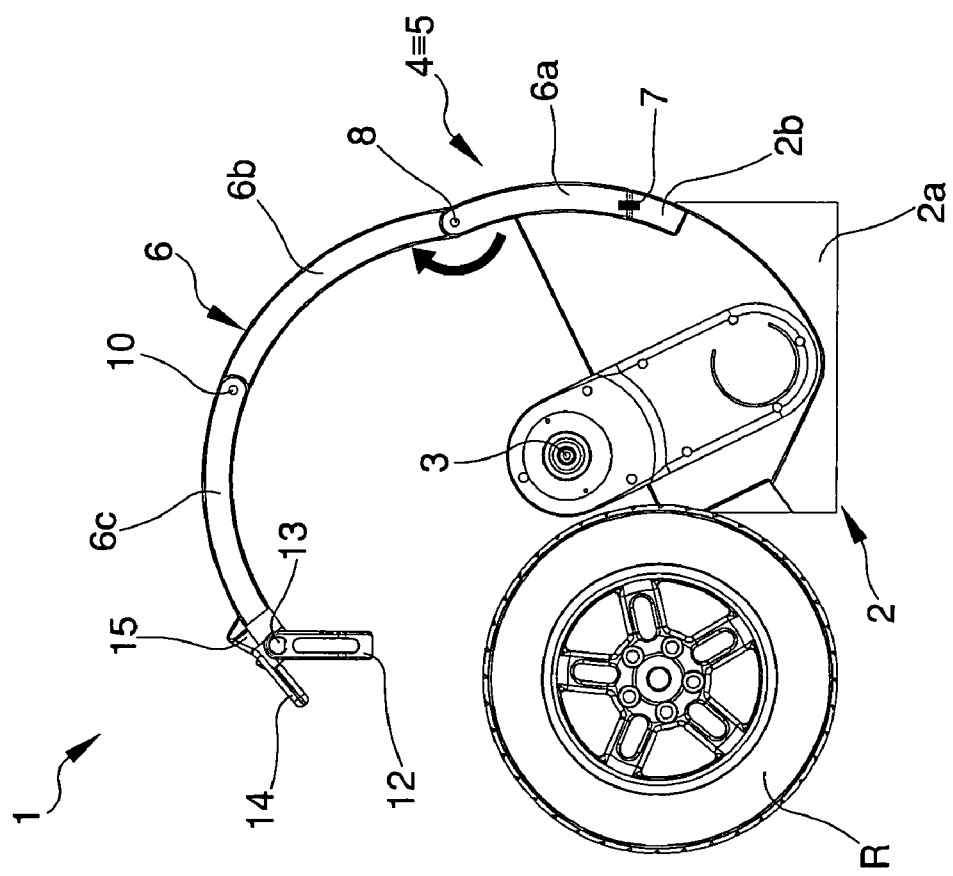

Once the wheel R to be balanced has been placed in the work area close to the machine 1, the arm 6 is made to turn around the first hinge 8 (FIG. 3) and to move along the prismatic guides 7 until the jaws 12 are positioned above the wheel R (FIG. 4).

At this point, the second section 6b is pushed downwards, causing the second section 6b to turn with respect to the first section 6a.

Figure 6:
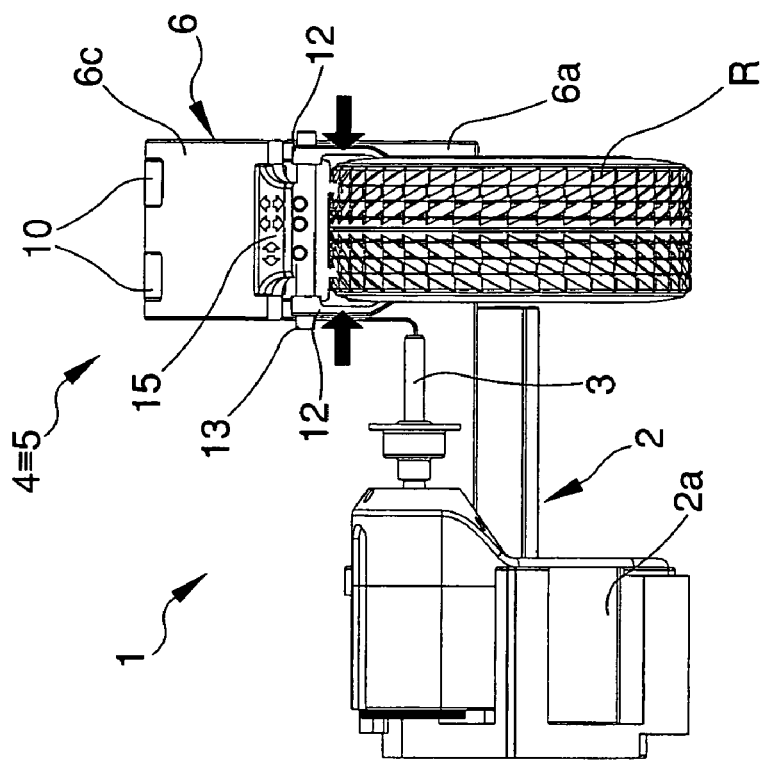
Figure 5:
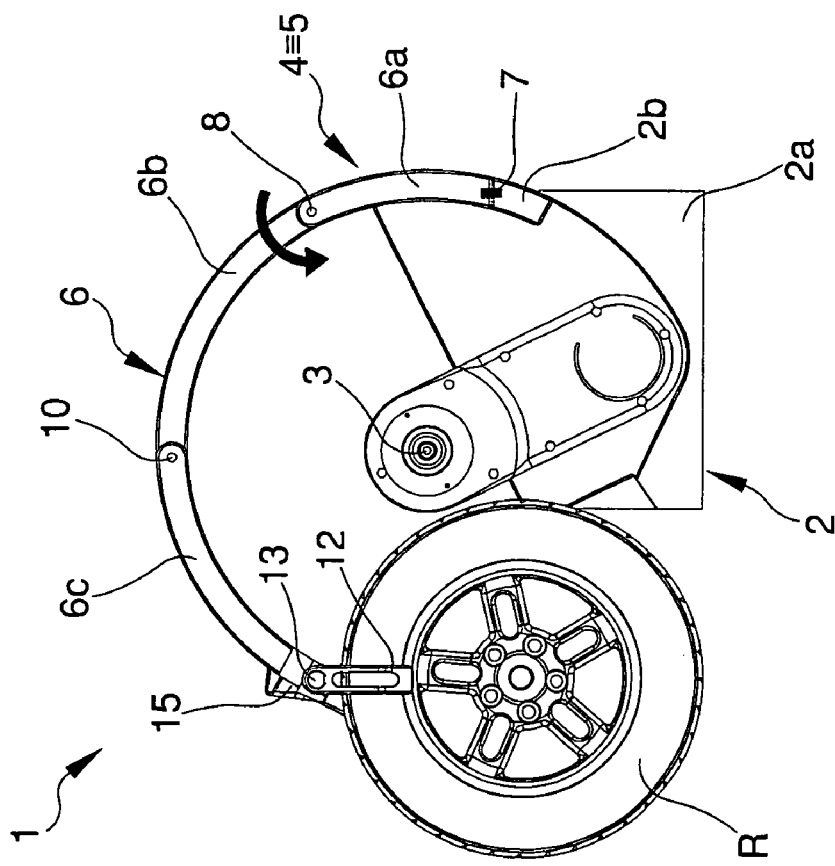

In this way the jaws 12 are placed on the opposite sides of the wheel R (FIG. 5), to be tightened on it (FIG. 6).

Figure 7:
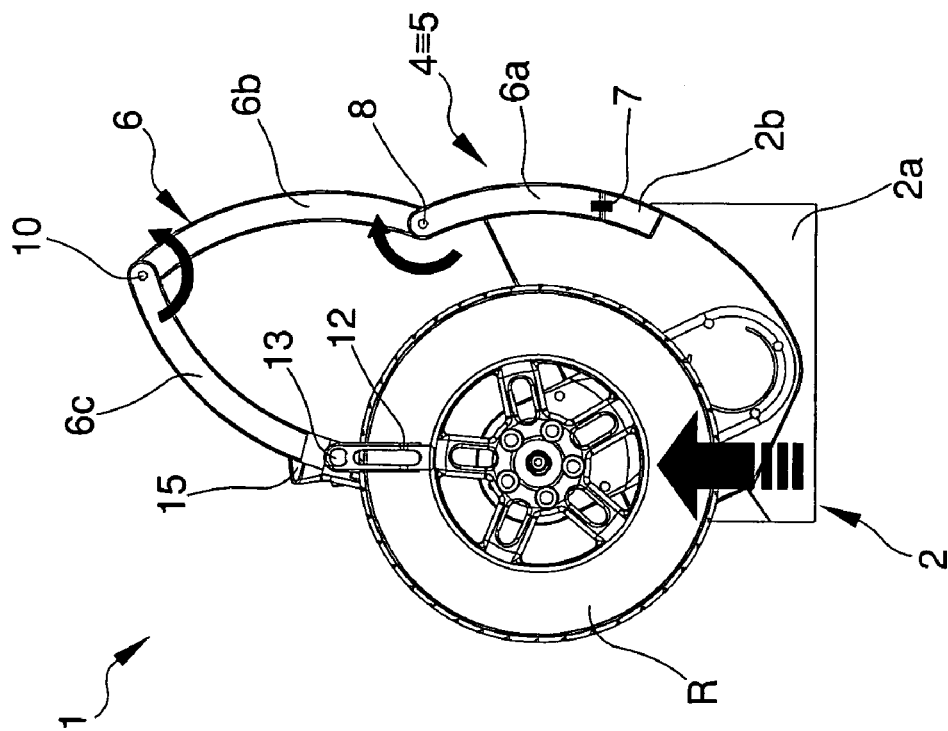

By a simple pushing action exercised by the operator, the arm 6 is made to turn around the first hinge 8 and the second hinge 10 lifting the wheel R until this is positioned coaxially with the balancing spindle 3 (FIG. 7).

Figure 8:
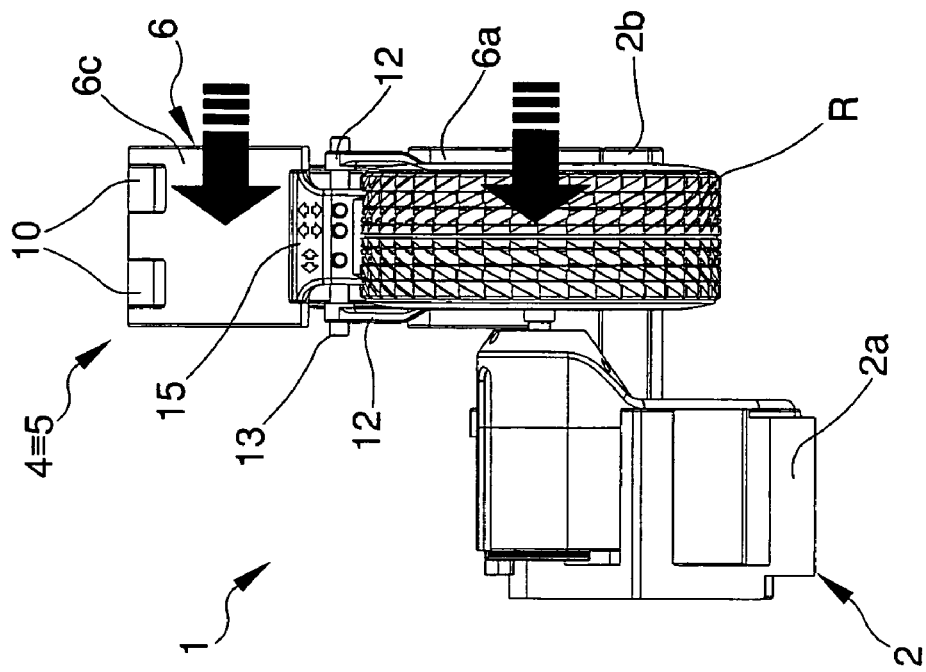

At this point the wheel R is fitted on the balancing spindle 3 causing the arm 6 to again slide along the prismatic guides 7 (FIG. 8).

Figure 9:
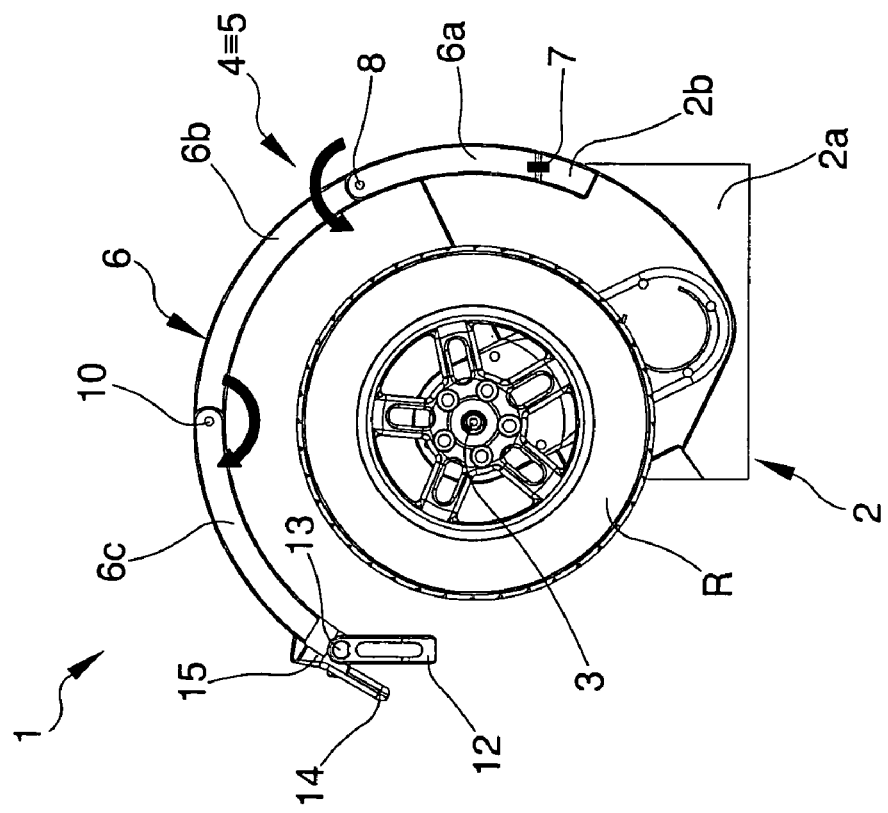

Once the rim of the wheel R has been fastened to the balancing spindle 3, the jaws 12 can be released from the sides of the wheel R and the arm 6 can be placed in protection configuration, in which it coaxially envelops the upper portion of the wheel R (FIG. 9).

Figure 10:
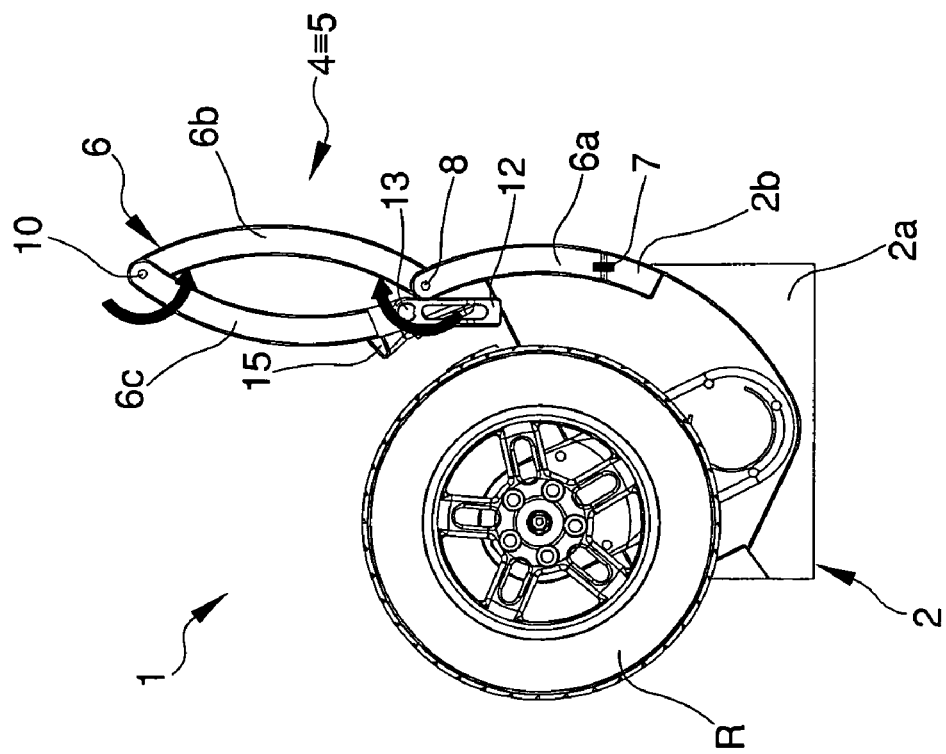

Furthermore, while the wheel R remains fitted on the balancing spindle 3, the arm 6 can be made to turn both around the first hinge 8 and the second hinge 10, in actual fact folding the third section 6c over the second section 6b of the arm 6 and leaving the wheel R uncovered for any inspections/jobs by the operator (FIG. 10).

It has in practice been ascertained how the described invention achieves the proposed objects.

In this respect, the fact is underlined that the machine according to the invention permits, with a practical and compact structure, lifting and lowering the wheel to be balanced in an effortless way and, at the same time, ensures conditions of utmost safety for the operator when the wheel is made to rotate.

It should be further noted that the particular solution of using self-balancing means like those provided by the present invention permits making a multifunctional device without motorisations and, therefore, very lightweight and inexpensive.

The invention claimed is:

1. A balancing machine for balancing vehicle wheels, comprising at least a base frame supporting at least a balancing spindle for balancing at least a vehicle wheel, at least a lifting device associable with said base frame and suitable for fitting and removing said wheel onto and off said balancing spindle, and at least a protection guard associable with said base frame and suitable for covering said wheel fitted on said balancing spindle, wherein said lifting device and said protection guard are integrated in a multifunctional device, wherein said multifunctional device comprises at least an arm associable with said base frame in a moving way to lift said wheel and which, during balancing, can be placed in a protection configuration at least partially around said wheel, and said multifunctional device further comprises grip means for gripping said wheel associable with said arm.

2. The machine according to claim 1, wherein in said protection configuration, said arm is substantially shaped like the arc of a circle.

3. The machine according to claim 1, wherein in said protection configuration said arm is arranged above said wheel.

4. The machine according to claim 1, wherein said arm comprises at least a first section associable with said base frame in a way sliding along a sliding direction substantially parallel with said balancing spindle.

5. The machine according to claim 4, wherein said first section slides freely in said sliding direction.

6. The machine according to claim 4, wherein said multifunctional device comprises first motorised actuator means for driving said first section in said sliding direction.

7. The machine according to claim 4, wherein said arm comprises at least a second section associated with said first section by interposition of a first hinge for swinging around a rotation axis substantially parallel with said balancing spindle.

8. The machine according to claim 7, wherein said arm comprises first self-balancing means for distributing the weight of said wheel on said arm during the rotation of said second section with respect to said first section.

9. The machine according to claim 8, wherein said first self-balancing means comprises at least a first balancer integrated at said first hinge.

10. The machine according to claim 7, wherein said arm comprises second motorised actuator means for operating in rotation said second section with respect to said first section.

11. The machine according to claim 7, wherein said arm comprises at least a third section associated with said second section by interposition of a second hinge for swinging around a rotation axis substantially parallel with said balancing spindle.

12. The machine according to claim 11, wherein said arm comprises second self-balancing means for distributing the weight of said wheel on said arm during the rotation of said third section with respect to said second section.

13. The machine according to claim 12, wherein said second self-balancing means comprise at least a second balancer integrated at said second hinge.

14. The machine according to claim 11, wherein said arm comprises third motorised actuator means for operating in rotation said third section with respect to said second section.

15. The machine according to claim 11, wherein said multifunctional device comprises grip means for gripping said wheel, said grip means being associated with said third section of the arm.

16. The machine according to claim 11, wherein said multifunctional device additionally comprises at least a handle for manual grip by an operator, said handle being associated with said third section.

17. The machine according to claim 11, wherein said multifunctional device comprises management and control means for managing and controlling the operation of the machine, said management and control means comprising at least a control panel associated with said third section of the arm.

18. The machine according to claim 1, wherein said grip means are associated with the free extremity of said arm.

19. The machine according to claim 1, wherein said grip means are of the gripper type.

20. The machine according to claim 19, wherein said grip means comprise at least two jaws that can be positioned on the opposite sides of said wheel, at least one of said jaws being associated with said arm in a moving way in the direction of approaching and moving away from the other jaw.

21. The machine according to claim 20, wherein at least one of said jaws is associated with said arm in a way turnable around a rotation axis substantially parallel with said balancing spindle.

22. The machine according to claim 21, wherein said grip means comprise at least a substantially cylindrical rod and associated with said arm along a direction substantially parallel with said balancing spindle, at least one of said jaws being engaged in a sliding way both in rotation and in translation on said rod.

23. The machine according to claim 20, wherein said grip means comprise fourth motorised actuator means for operating at least one of said jaws along the approaching and moving away direction with respect to the other jaw.

24. The machine according to claim 1, wherein said grip means are of the hook type.

25. The machine according to claim 1, wherein said multifunctional device also comprises at least a handle for manual grip by an operator.

26. The machine according to claim 25, wherein said handle is associated with the free extremity of said arm.

27. The machine according to claim 1, wherein said multifunctional device comprises management and control means for managing and controlling the operation of the machine.

28. The machine according to claim 27, wherein said management and control means comprise at least a control panel associated with said arm.

29. The machine according to claim 28, wherein said control panel is associated with the free extremity of said arm.

* * * * *